United States Patent
Swisher et al.

[11] Patent Number: 5,966,912
[45] Date of Patent: Oct. 19, 1999

[54] TRAILMOWER WITH ANGLED BUMPER ROLLERS

[75] Inventors: Max B. Swisher, Warrensburg; Clyde J. Fleener, Centerview, both of Mo.

[73] Assignee: Swisher Mower & Machine Co., Inc., Warrensburg, Mo.

[21] Appl. No.: 08/899,617

[22] Filed: Jul. 24, 1997

[51] Int. Cl.⁶ .................................................. A01D 34/00
[52] U.S. Cl. ................................... 56/1; 56/DIG. 15
[58] Field of Search .......................... 56/6, 7, 17.2, 17.4, 56/14.7–15.8, 13.5, 12.7, 208, 210, DIG. 20, DIG. 15, 1

[56] References Cited

U.S. PATENT DOCUMENTS

| | | | |
|---|---|---|---|
| 3,570,225 | 3/1971 | Miskiewicz | 56/25.4 |
| 4,216,643 | 8/1980 | Malone | 56/320.1 |
| 4,662,646 | 5/1987 | Schlapman et al. | |
| 4,901,507 | 2/1990 | Cracraft | 5/6 |
| 5,086,614 | 2/1992 | Pestka | |
| 5,425,224 | 6/1995 | Downey et al. | 56/15.8 |

Primary Examiner—Thomas B. Will
Assistant Examiner—Robert Pezzuto
Attorney, Agent, or Firm—Mark E. Brown; Litman, Kraai & Brown LLC

[57] ABSTRACT

A self contained trailmower includes a respective angled bumper housing positioned on each front corner of the mower deck in a position such that the angled housing on the outside of the mower deck is the first part of the deck to hit an obstacle in the path of the mower. Each of the bumper housings holds a plurality of bumper rollers with the rollers being placed in a line along the outer edge of each bumper housing and protruding outward past the bumper housing such that the rollers are the first portion of the mower to encounter the obstacle. The rollers thus urge the mower deck outward away from the obstacle and serve to cushion the impact between mower deck and obstacle. The mower also incorporates a convenient height adjustment feature.

5 Claims, 4 Drawing Sheets

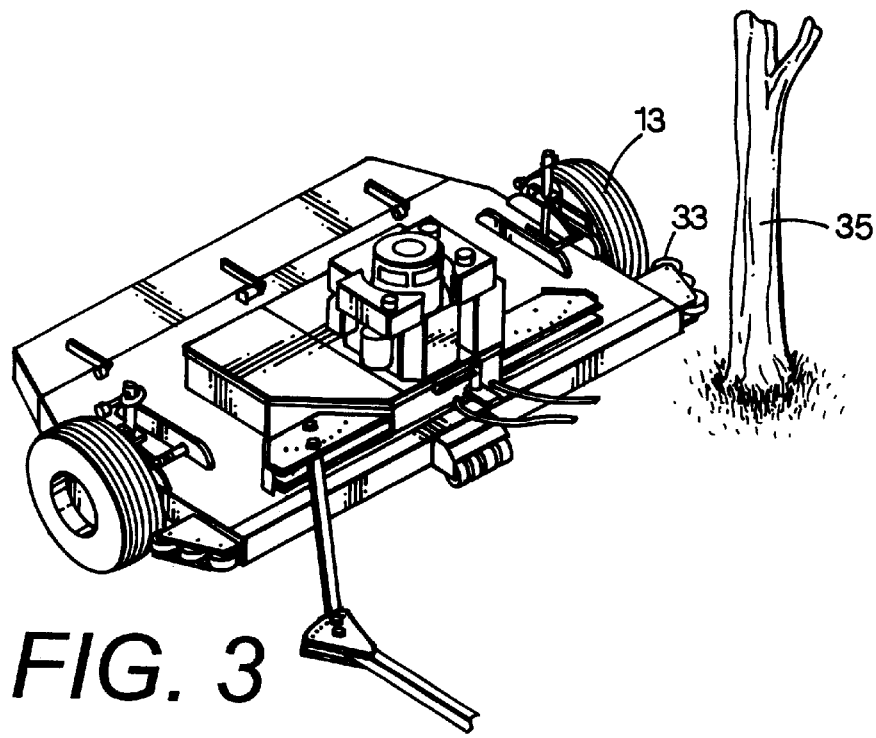
FIG. 3
FIG. 4
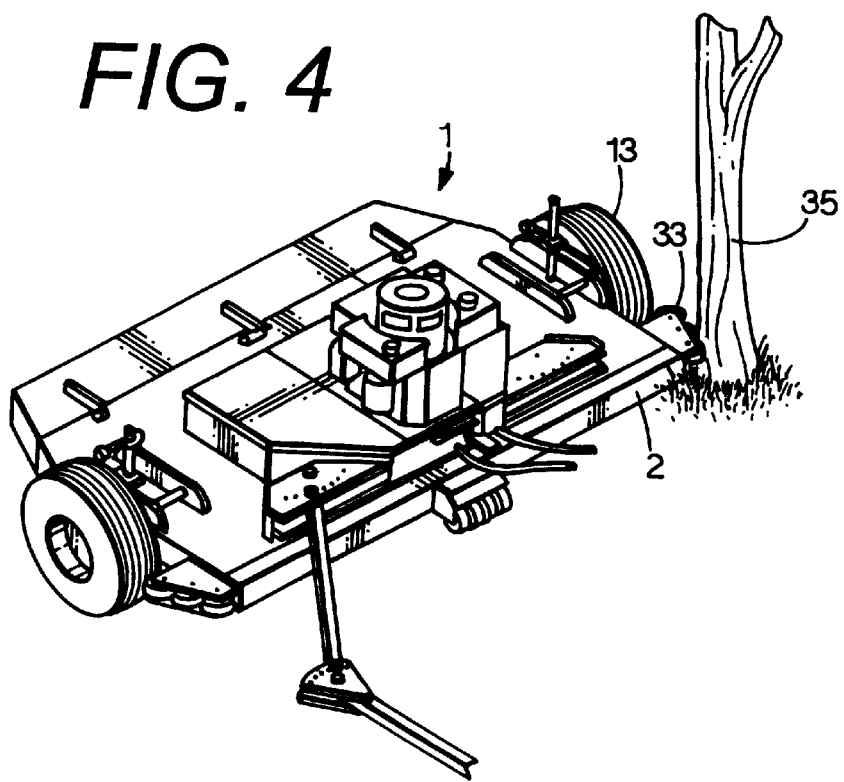

5,966,912

TRAILMOWER WITH ANGLED BUMPER ROLLERS

FIELD OF THE INVENTION

The present invention relates to an independently powered trailmower designed for towing behind an all terrain vehicle (ATV) or the like. More particularly, the inventive trailmower includes a mower deck with a pair of outrigger main wheels positioned behind an angled bumper housing. During use, as the mower encounters an obstacle such as a tree trunk, the bumper rollers urge the mower deck outward and away from the tree trunk while minimizing damage to both mower and tree trunk.

BACKGROUND OF THE INVENTION

With the recent popularity of ATV's, efforts have been made to make these vehicles, which were initially designed primarily for recreation, more utilitarian. One innovation which is gaining increased acceptance are trailmowers which are towed behind an ATV. Another use for trailmowers is to extend the cutting swath of a lawn or garden tractor which already incorporates an existing mower deck.

These trailmowers typically are self contained mower decks with attached engines which are attached to the ATV or tractor via an offset articulating tow bar. A typical example is found in U.S. Pat. No. 5,086,614 to Thomas Pestka.

Due to the fact that trailmowers are usually offset with respect to the path of travel of the towing vehicle, as well as being positioned behind the tow vehicle, it is difficult for the vehicle operator to gauge the path of the outside of the mower deck. It is common, then for an operator to inadvertently hit obstacles, such as tree trunks, particularly with the outside edge of the offset trailmower.

In the past, it is known to provide rigid angled flanges on the outside of the trailmower deck which are positioned to be the first part of the deck to hit an obstacle. Due to their angle, these flanges urge the mower deck away from the obstacle, thus allowing it and the tow bar to pivot about the tow vehicle and skirt the obstacle. A problem with these prior art flanges is the damage they do to obstacles, particularly tree trunks, when they hit them. Another problem is the potential damage to the trailmower by repetitive abrupt shocks to the trailmower deck as the flanges encounter obstacles.

It is clear then, that a need exists for a trailmower which incorporates better protection from encounters from obstacles, both for the obstacle and the mower deck itself.

SUMMARY OF THE INVENTION

The present invention is directed to a self contained trailmower with a mower deck supported by pair of ground engaging wheels positioned on respective sides of the mower deck. A respective angled bumper housing is positioned on and extends outward from each front corner of the mower deck in front of the wheel on that side in a position such that the angled housing on the outside of the mower deck is the first part of the deck to hit an obstacle. Each of the bumper housings includes an upper plate and a lower plate with a plurality of rollers positioned therebetween with the rollers being placed in a line along the angled outer edge of the housing. Each roller protrudes outward past the upper and lower housing plates such that the rollers are the first portion of the mower to encounter the obstacle. The rollers thus urge the mower deck outward away from the obstacle such that the mower deck and tow bar pivots slightly about the tow vehicle. The rollers cushion the impact between mower deck and obstacle to minimize damage to both the obstacle and the mower deck.

OBJECTS AND ADVANTAGES OF THE INVENTION

The principal objects of the present invention include: providing a trailmower with angled bumper housings; providing such a trailmower where the bumper housings are placed on the front corners of the mower deck in positions to first encounter obstacles while the mower is towed; providing such a trailmower in which a plurality of cushioning rollers are positioned in each bumper housing; providing such a mower in which the rollers are the first portion of the mower to hit an obstacle, thus cushioning the impact of hitting the obstacle and urging the mower housing outward away from the obstacle; providing such a trailmower which minimizes damage to both obstacles and the mower deck itself; providing such a trailmower with an improved, convenient height adjustment mechanism; and providing such a trailmower which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a perspective view of the trailmower of FIG. 1 as it approaches a tree.

FIG. 4 is a perspective view of the trailmower of FIG. 1 as the bumper rollers hit the tree trunk and urge the mower deck outward.

DETAILED DESCRIPTION OF THE INVENTION

Figure 1:
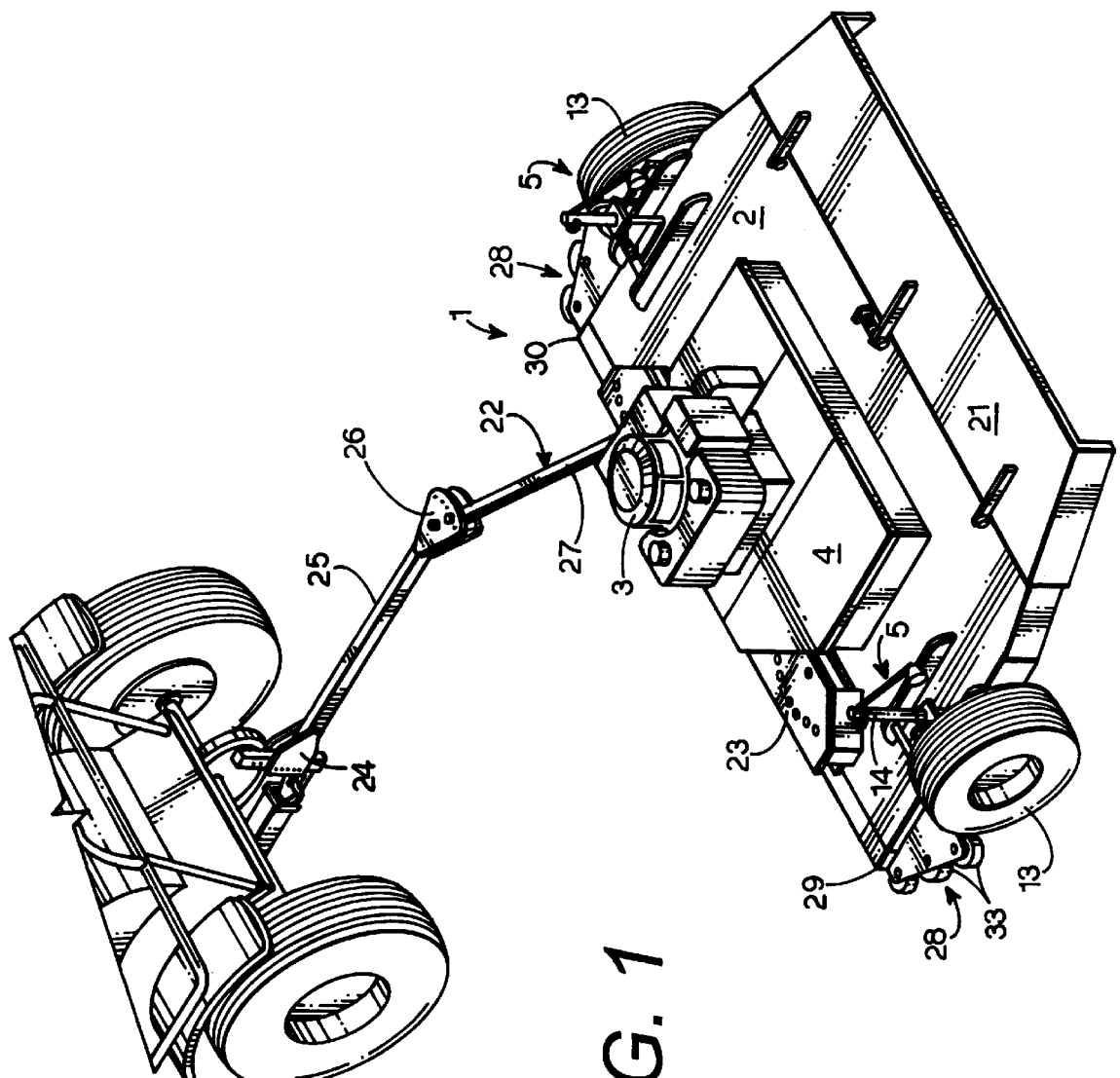
FIG. 1 is a perspective view of a trailmower with angled bumper rollers in accordance with the present invention being towed by a tow vehicle via a tow bar which is adjustable in both mower offset angle and hitch height.

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings, a trailmower with angled bumper rollers is shown and generally indicated at 1. The trailmower 1 includes a generally rectangular mower deck housing 2 with an internal combustion engine 3 driving a conventional V belt (not shown) within a belt housing 4 with the belt being attached to shafts driving a plurality of rotating blades (not shown) beneath the housing 2 in a conventional fashion.

Figure 2:
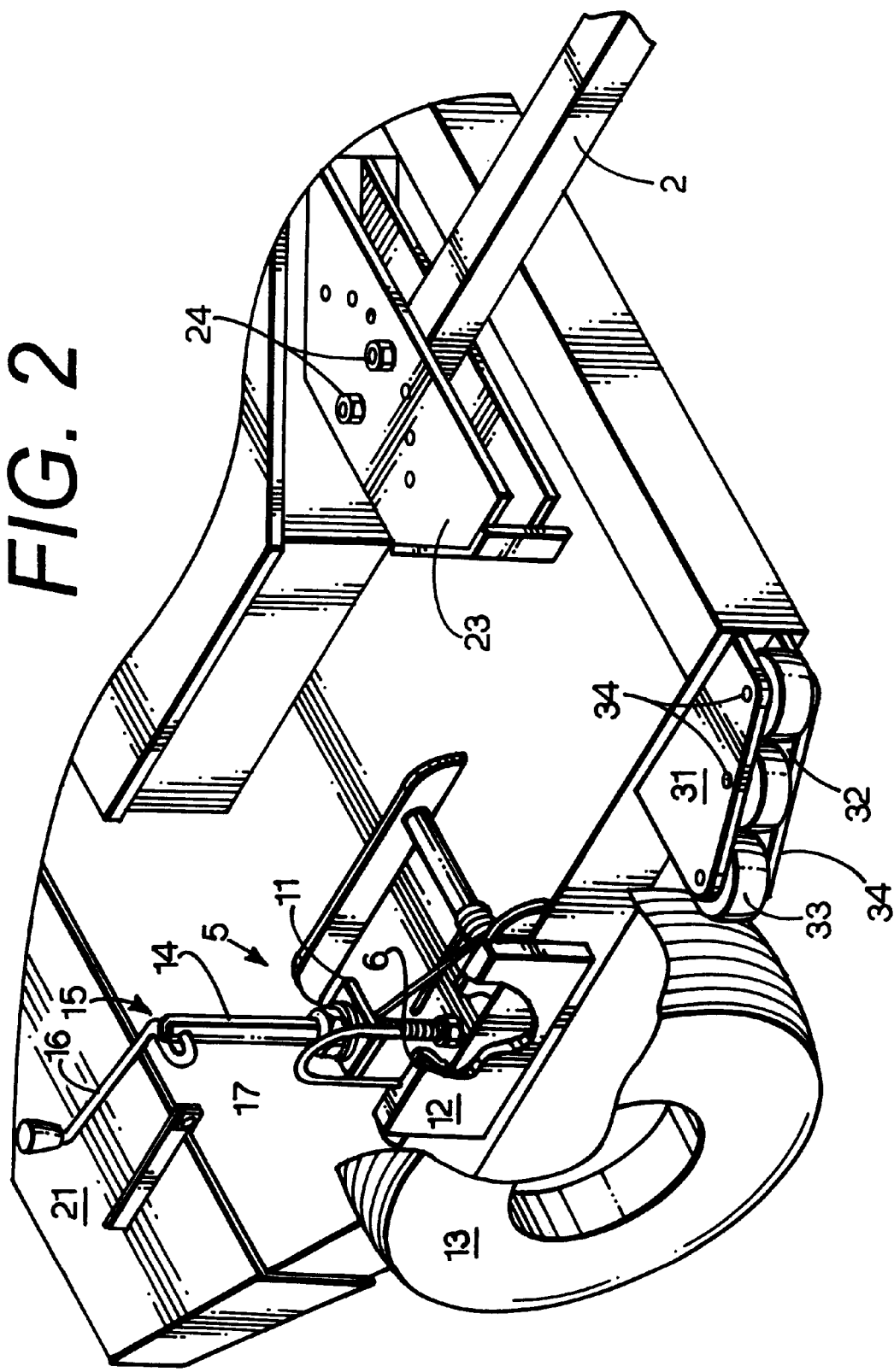
FIG. 2 is a greatly enlarged fragmentary view of one side of the trailmower of FIG. 1, showing the arrangement of bumper rollers in an angled bumper housing on the front corner thereof and also illustrating a mower height adjustment mechanism.

A housing adjustment mechanism 5 includes a pair of theraded shafts 6 which are attached to and extend upward from opposite sides of the mower deck housing 2. The threaded shafts 6 which are attached to and extend upward from respective sides of the mower deck 2 and through bores in respective horizontal plates 11. Each plate 11 is attached to and forms a part of a respective support bracket 12 which brackets 12 are attached to respective ground engaging wheels 13. A threaded sleeve 14 forms a part of a hand crank 15 with each sleeve 14 being threaded onto the top of a respective threaded shaft 6. The hand crank 15 includes a crank handle 16 which is attached to the threaded tube 14 via an articulating pivot 17. The pivot 17 allows the crank handle 16 to be flipped downward to a storage position (FIG. 1) from an operative position (FIG. 2). The mower deck 2 is thus infinitely adjustable in cutting height by pivoting the crank handles 16 upward to the operative position and turning the crank handles 16 and attached threaded sleeves 14 to raise and lower the threaded shafts 6, along with respective sides of the attached mower deck 2, relative to the plate 11 and the attached wheels 13. This allows the mower height to be adjusted to exactly match the mower height of any towing vehicle, such as a tow vehicle 18.

A spring loaded rear discharge chute 21 is attached to and positioned to the rear of the mower deck housing 2 and an articulating tow bar 22 is rigidly bolted to one of a pair of attachment brackets 23 on the front of the mower deck housing 2. The tow bar 22 includes a height variable, articulating hitch element 24 which allows a front portion 25 of the tow bar 22 to be attached to tow vehicles, such as the vehicle 18, equipped with hitches of varying heights. The tow bar 22 also includes an angular adjustment bracket 26 which allows the towed offset angle of the mower 1 to be adjusted by varying the angle between the front tow bar portion 25 and a rear tow bar portion 27.

Truncated triangularly shaped bumper housings 28 are attached to and extend outward from respective left and right front corners 29 and 30 of the mower deck housing 2. Each of the bumper housings 24 includes an upper horizontal plate 31 and a lower horizontal plate 32. A plurality of bumper rollers 33 are rotatably attached to respective roller shafts 34 which extend between the upper and lower bumper housing plates 31 and 32 near an angled outside edge 34 thereof. The bumper rollers 33 extend outward past the edge 34 of the bumper housing plates 31 and 32 such that they form a bumper surface which angles outward and rearward from front to back of each bumper housing 28. Each bumper housing 24 and bumper rollers 33 are positioned immediately in front of a respective one of the support wheels 13.

Figure 5:
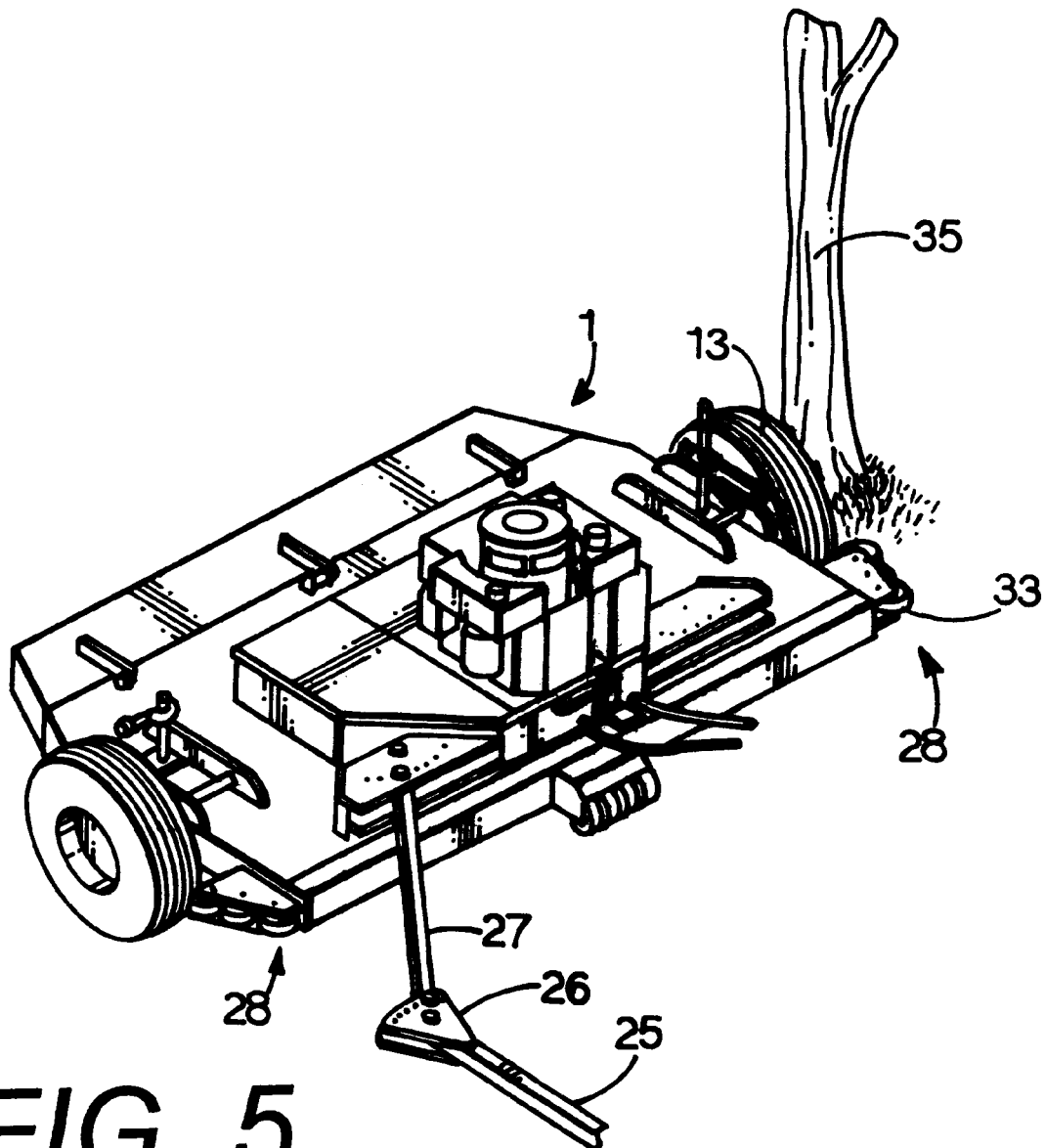
FIG. 5 is a perspective view of the trailmower of FIG. 1, shifted outward around the tree trunk.

Referring to FIGS. 1 and 3–5, the trailmower 1 is shown with the outside left front corner 25 approaching a tree trunk 35, hitting the tree trunk 35 and being forced outward away from the tree trunk 35. As shown in FIG. 4, the angled bumper rollers 33 are the first thing to encounter the trunk 35. The collective angle of the rollers 33 causes the tree trunk to hit each roller 33 in turn, which rollers 33 collectively act to sequentially deflect the mower 1 outward away from the tree trunk 35 to a position, as shown in FIG. 5, which allows the left wheel 13 to pass around the trunk 35. As the trunk 35 is bypassed by the mower 1, the tow bar 22, which is pivotally attached to the tow vehicle 18 via an the articulating hitch 24, pivots back to a position past the trunk 35 so that the mower deck 1 is again offset and tracking with the tow vehicle 18. The bumper rollers 33 and their collective angle minimize damage to both the tree trunk 35 and cushion the impact of the trunk 35 against the mower deck housing 2 while allowing the operator to mow close to the trunk 35.

The illustrated position of the support wheels 13 relative to the bumper housing 28 is exemplary only. Other arrangements of mower deck 2, wheels 13 and bumper housing 28 are possible which can be equally effective. Furthermore, while 3 of the bumper rollers 33 are shown on each front corner of the deck housing 2, any number and size of rollers 33 can be provided, depending upon the size of the mower deck 2 and the position of the wheels 13. While the mower 1 is shown as a self contained unit with an integral gasoline engine 3, the inventive angled bumper rollers can be used effectively with any trailmower, including a PTO shaft driven or hydraulic PTO driven unit, or even a wide belly mower. It is thus to be understood that while certain forms of the present invention have been illustrated and described herein, it is not to be limited to the specific forms or arrangement of parts described and shown.

What is claimed and desired to be secured by Letters Patent is as follows:

1. A trailmower comprising:
   a. a self-contained mower deck housing which is trailerable behind a tow vehicle;
   b. a pair of supporting ground engaging wheels with one of said wheels positioned on each side of said mower deck housing such that said mower deck is self supporting;
   c. a bumper housing attached to and extending at an angle outward and rearward from a front corner of said mower deck housing in front of one of said wheels; and
   d. at least one bumper roller positioned in said bumper housing and partially protruding outward therefrom.

2. A mower as in claim 1, wherein there are a plurality of said bumper rollers positioned in and partially protruding outward from said bumper housing.

3. A mower as in claim 2, wherein:
   a) said bumper housing includes an upper and a lower plate with an outer surface which extends at an angle outward and rearward from a front corner of said mower deck housing; and
   b) said plurality of rollers are positioned along said angled outer surface between said upper and lower plates.

4. A mower as in claim 3, wherein there are two of said bumper housings which are mirror images of each other with each one including a like plurality of said rollers positioned along an angled outer surface between said upper and lower plates and with each one being attached to and extending outward from a respective front corner of said mower deck housing in front of a respective one of said wheels.

5. A trailmower comprising:
   a. a self-contained mower deck housing which is and is trailerable behind a tow vehicle;
   b. a pair of supporting ground engaging wheels with one of said wheels positioned on each side of said mower deck housing such that said mower deck is self supporting;
   c. a bumper housing attached to and extending at an angle outward and rearward from a front corner of said mower deck housing in front of one of said wheels; and
   d. a pair of mirror image bumper housings attached to and extending outward from respective front corners of said mower deck housing, each said bumper housing including an outer surface extending at an angle outward and rearward from a respective front corner of said mower deck housing; and e. a plurality of bumper rollers positioned in each said bumper housing, said rollers extending along the angled outer surface and partially protruding outward therefrom, each bumper housing being positioned in front of a respective one of said ground engaging wheels.

* * * * *